United States Patent
Wahba et al.

(10) Patent No.: US 9,934,625 B1
(45) Date of Patent: Apr. 3, 2018

(54) DETECTING VEHICLE COLLISIONS BASED ON MOBLE COMPUTING DEVICE DATA

(71) Applicant: Uber Technologies, Inc., San Francisco, CA (US)

(72) Inventors: Karim Wahba, San Francisco, CA (US); Dhruv Tyagi, San Francisco, CA (US); Andrew Beinstein, San Francisco, CA (US); Amritha Prasad, San Francisco, CA (US); Audrey Lawrence, San Francisco, CA (US); Jose Alvarez, San Francisco, CA (US); Steve Pennington, San Francisco, CA (US); Corin Trachtman, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/421,417

(22) Filed: Jan. 31, 2017

(51) Int. Cl.
| | |
|---|---|
| *G05B 23/02* | (2006.01) |
| *G07C 5/08* | (2006.01) |
| *G07C 5/00* | (2006.01) |
| *B60R 21/00* | (2006.01) |

(52) U.S. Cl.
CPC .......... *G07C 5/0808* (2013.01); *B60R 21/00* (2013.01); *G07C 5/008* (2013.01); *B60R 2021/0027* (2013.01)

(58) Field of Classification Search
CPC ...... G07C 5/0808; G07C 5/008; B60R 21/00; B60R 2021/0027

USPC ................................................. 340/436, 439
See application file for complete search history.

(56) References Cited

U.S. PATENT DOCUMENTS

| | | | |
|---|---|---|---|
| 6,927,727 B2 | 8/2005 | Cleghorn | |
| 9,256,991 B2 | 2/2016 | Crawford | |
| 9,457,754 B1* | 10/2016 | Christensen | ........ B60R 21/0136 |
| 2002/0120380 A1* | 8/2002 | Hambsch | .......... B60R 21/013 701/45 |
| 2002/0121981 A1* | 9/2002 | Munch | .................. G08B 21/06 340/576 |
| 2005/0027434 A1* | 2/2005 | Hirose | ............... G01C 21/3492 701/117 |
| 2006/0208169 A1* | 9/2006 | Breed | ................... B60N 2/002 250/221 |
| 2008/0116680 A1* | 5/2008 | Mita | ................ B60R 21/01538 280/801.1 |
| 2010/0202495 A1* | 8/2010 | Kagawa | .................. B60T 7/22 375/142 |
| 2010/0305857 A1* | 12/2010 | Byrne | ...................... G06T 7/73 701/301 |
| 2012/0299344 A1* | 11/2012 | Breed | ................... B60N 2/002 297/217.1 |

(Continued)

*Primary Examiner* — Brian Zimmerman
*Assistant Examiner* — Thang Tran
(74) *Attorney, Agent, or Firm* — Mahamedi IP Law LLP

(57) ABSTRACT

A network computing system receives local device data from a mobile computing device of a person within a vehicle. The local device data may include sensor data from one or more sensors of the mobile computing device, and location data determined from a position-determination resource of the mobile computing device. The network computing system may detect a vehicle collision event based on the local device data. Additionally, the network computing system may determine a classification of the vehicle collision event based on the local device data.

20 Claims, 5 Drawing Sheets

(56) References Cited

U.S. PATENT DOCUMENTS

| | | | |
|---|---|---|---|
| 2014/0310788 A1* | 10/2014 | Ricci | B60Q 1/00 726/6 |
| 2015/0279122 A1* | 10/2015 | Lorenzen | G07B 15/063 705/13 |
| 2015/0371157 A1* | 12/2015 | Jaffe | G06Q 10/025 705/6 |
| 2016/0029193 A1* | 1/2016 | Iwai | H04L 12/1895 455/404.1 |
| 2016/0094964 A1* | 3/2016 | Barfield, Jr. | H04W 4/22 455/404.2 |
| 2017/0039890 A1* | 2/2017 | Truong | G09B 19/167 |
| 2017/0053461 A1* | 2/2017 | Pal | G07C 5/02 |
| 2017/0072850 A1* | 3/2017 | Curtis | B60W 50/0097 |
| 2017/0178419 A1* | 6/2017 | Paridel | G07C 5/008 |

* cited by examiner

DETECTING VEHICLE COLLISIONS BASED ON MOBLE COMPUTING DEVICE DATA

BACKGROUND

In-vehicle monitoring services exist which provide different types of protection for occupants of vehicles. Among other types of services, in-vehicle monitoring services can interface with the components of the vehicle to detect when events such as airbag deployment or unauthorized use takes place. Such services typically employ vehicle-specific hardware, making such services relatively unavailable for many types of drivers, particularly with the growth of transportation-related services.

DETAILED DESCRIPTION

Figure 1:
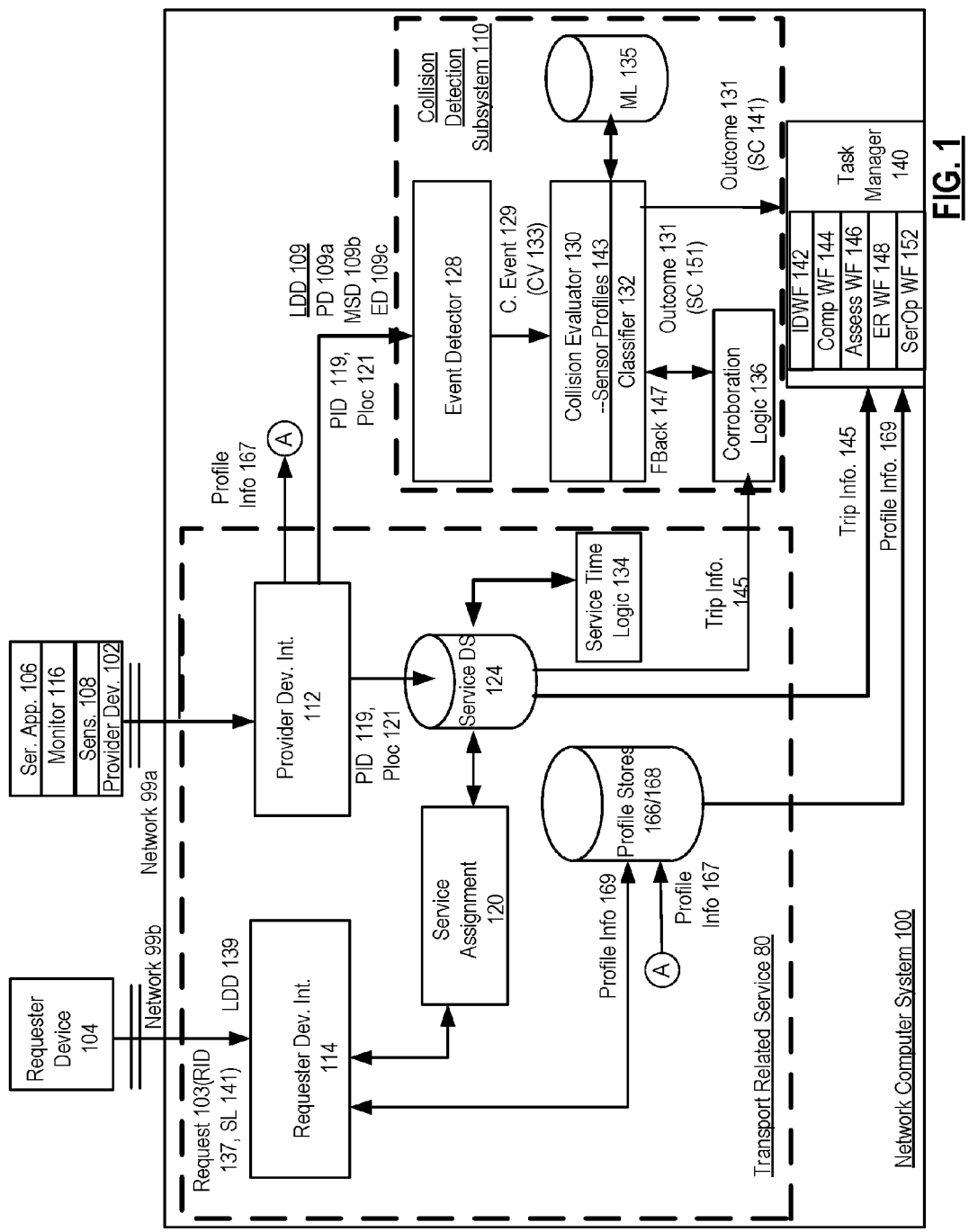
FIG. 1 illustrates a network computer system to remotely detect and evaluate vehicle collisions, according to one or more examples.

Examples provide for a network computer system that detects when individual vehicles are involved in an accident, using information communicated from devices within and/or passengers of those vehicles. A network computer system can detect when accidents occur, and further gauge a severity of the accident. Additionally, the network computer system can implement actions which serve to assist the driver, passenger, or other user who may be impacted by the accident.

In some examples, one or more mobile computing devices communicate with the network computer system (e.g., a computing device, a server, or a combination of servers, etc.) to determine a severity of a vehicle collision event. In such examples, individual mobile computing devices can transmit information from various sources that are local to the respective mobile computing device ("local device data"). By way of example, the local device data can include data retrieved from or detected by motion sensors, environmental sensors, position determination devices (e.g., Global Positioning System devices), and/or other locally determined information. The mobile computing device may continuously or responsively transmit the local device data to a server (or combination of servers), which in turn run processes to detect when a collision occurs with a given vehicle, as well as a severity level of the collision. Among other benefits, some examples allow a network system to detect vehicle collision events (e.g., accidents) in real time, and determine an action or series of support tasks to perform for the riders and/or drivers involved based on the determined severity level.

In one implementation, a network computer system communicates with a mobile computing device of a vehicle's passenger (e.g., driver or rider) to receive local device data, including (i) sensor data from one or more sensors of the mobile computing device, and/or (ii) location data (e.g., GPS data) from a component of the mobile computing device. The network computer system can detect a vehicle collision event based at least in part on the local device data provided from the mobile computing device. The network computer system can also determine a classification or severity level for the vehicle collision event based at least in part on the local device data. Based on the determined severity level, the network computer system can determine an action to perform that is associated with the vehicle collision event.

In some examples, a network computing system receives local device data from a mobile computing device of a person within a vehicle. The local device data may include sensor data from one or more sensors of the mobile computing device, and location data determined from a position-determination resource of the mobile computing device. The network computing system may detect a vehicle collision event based on the local device data. Additionally, the network computing system may determine a classification of the vehicle collision event based on the local device data. The classification may be based on at least one of (i) a first level in which a likelihood of injury is below a first threshold probability, and (ii) a second level in which a likelihood of injury is above a second threshold probability. In some examples, an action may be selected or otherwise performed based on the determined severity level.

Among other benefits and technical affects, examples such as described enable a network computer system to detect and evaluate vehicle collisions, and to initiate support actions using mobile computing devices. Depending on implementation, mobile computing devices may be associated with the driver, any passengers within the vehicle, or a combination of the driver and passengers. The network computer system, and the local device data which it receives and processes, can be inherently more responsive and accurate as to a nature of a collision, as compared to, for example, eyewitness description and actions of first responders.

Still further, examples as described allow for objective, accurate determinations of the occurrence of an accident and its severity using data collected by one or more mobile computing devices within the vehicle. Moreover, in some implementations, the data may be collected as part of a background or ancillary process. In this regard, examples inherently reduce delays and inefficiencies within a network, including reducing a consumption of resources on mobile computing devices (e.g., battery life) that are used to implement services (e.g., transport arrangement services). As a result of automated accident detection, a series of support tasks or remedial actions can relieve or decrease delays in the network associated with the accident—including users directly involved with the accident, users in the vicinity of the accident, and/or all users included within the network. In the event of a vehicular accident, a network computer system, as described with various examples, can implement automated measures to reduce the impact of traffic congestion and delay on those involved, as well as other vehicles and users who may be providing or receiving transport services. For example, a network computer system can operate to enable safe and efficient removal of vehicles involved in a collision from a roadway, while re-routing service providers and/or other traffic to avoid traffic and congestion.

As used herein, a client device, a computing device, and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver of a vehicle) that provides location-based services for requesters.

Still further, examples described relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). For the purpose of simplicity, in examples described, the service arrangement system can correspond to a transport arrangement system that arranges transport and/or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates an example of a network computer system to remotely detect and evaluate vehicle collisions. In particular, a network computer system 100 may be implemented to monitor vehicles used with transport-related services in order to detect vehicle collisions, and to initiate remedial actions to facilitate those affected by the collision. In examples described, the transport arrangement service may refer to, for example, any one or more of an on-demand service to transport people, food delivery service, package delivery services, etc.). While some examples are recited specifically in the context of a transport arrangement service, other examples can be implemented in numerous alternative service applications, including as a personal network system for an individual user, as part of an emergency monitoring system, or as part of a navigation system for personal or business use.

In monitoring for vehicle collision events, some examples provide that the system 100 classifies and/or determines a severity of the vehicle collision event. Additionally, the system 100 may initiate and/or plan remedial actions for those persons involved in the vehicle collision, as well as to mitigate the consequences of the vehicle collision event to other persons who may be directly or indirectly affected by the vehicle collision event.

In contrast to some conventional approaches, some examples provide that the system 100 classifies the severity of the vehicle collision event instantaneously, or in near real-time (e.g., within seconds of the vehicle collision event occurring). Additionally, some examples initiate and implement remedial actions automatically in response to the classification of vehicle severity. In contrast to conventional approaches, the system 100 can determine the classification of a detected vehicle collision (e.g., by severity), and initiate subsequent remedial actions without human input (e.g., input from driver or bystander). Moreover, the system 100 may make its determinations automatically, using a mobile computing device that is carried into the vehicle (e.g., smart phone or feature phone operated by driver of vehicle), rather than a sensor or component that is integrated with the vehicle involved in the collision.

Among other benefits, some examples provide that the system 100 can detect vehicle accidents in near real time, and further trigger an action or series of support actions (e.g., tasks to perform) for an associated rider and/or driver based on the determined severity level. In this way, the system 100 is more responsive to the safety and health of vehicle occupants as compared to some conventional approaches for monitoring collisions, which rely on direct communication with the vehicle occupants and/or monitoring of specific events within the vehicle (e.g., airbag deployment).

According to an example of FIG. 1, the system 100 can be implemented as a network service, or as part of a network service (e.g., as part of a transport arrangement service or package delivery service). In some examples, the system 100 is implemented using one or more servers that communicate with mobile computing devices of a population of users, including service providers. The mobile computing devices may continuously or intermittently transmit various types of sensor data, as well as location data (e.g., collectively "local device data") to the system 100. In turn, the system 100 analyzes the local device data of the devices individually and in aggregate in order to detect vehicle collisions and their respective severity.

Accordingly, examples provide that the system 100 is implemented on network side resources, such as on one or more computing systems, servers, or data centers, and/or implemented through other network computer system resources in alternative architectures (e.g., peer-to-peer networks, etc.). In some examples, the system 100 is provided as part of a network service, such as a transport arrangement service which arranges for transport between providers and customers (e.g., riders and drivers). While numerous examples are described in the context of a transport arrangement service, alternative implementations provide for other context and use for the system 100. For example, the system 100 may be implemented as a stand-alone service that any driver can utilize, or alternatively, as part of a traffic navigation service.

In an example of FIG. 1, the system 100 is shown to be in communication with each of a provider device 102 and requester device 104, representing devices operated by respective provider class users (e.g., drivers) and requester class users (e.g., riders) of a given population. The system 100 may be implemented as a network service (e.g., cellular network, wireless local area network, and/or other network services) that implements processes to communicate with mobile computing devices of users who provide or receive transport services, in order to continuously receive data to enable both the transport related services 80 and the collision detection sub-system 110. When a vehicle that is used to provide transport services is involved in a collision, the local device data 109 and/or the local device data 139 obtained from the mobile computing device(s) within the vehicle is used to (i) detect the vehicle collision event, and (ii) determine a severity level or classification for the vehicle collision event. Additionally, the system 100 can determine and initiate a remedial action based in part on the severity of the vehicle collision event, as well as information about others who may be affected by the vehicle collision event.

In some implementations, each provider device 102 and/or requester device 104 operates a service application 106, implemented through execution of instructions stored in one or more memory resources of the computing device. The service application 106 may correspond to a program (e.g., a set of instructions or code) that is downloaded and stored on the computing device from, for example, the system 100 and/or an "app" store. For example, the service application 106 can correspond to a requester client application to enable a requester user (rider) to view information about a network service and to make a request for a location-based service. As an alternative or variation, the service application 106 can correspond to a provider client application that operates to enable a service provider (driver) to receive invitations for providing services from the service arrangement system.

The service application 106 may execute on the provider device 102 to transmit information that includes the provider's identifier 119, the provider's current location 121, as well as any other information that enables the transport related service 80 to perform actions such as arranging transport assignments for the provider and monitoring the driver's vehicle. Likewise, for the recipient, the requester device 104 can execute the service application to similarly communication the requester's identifier 137 and the requester's current location. As described in greater detail, the transportation related service can use the information communicated by the rider device 104 to field transport requests 101, and to assign transportation providers for the requests.

Additionally, at least one of the service provider device 102 or requester device 104 may execute the service application 106 to determine sensor data from sensor devices 108 that are local to the respective device. Multiple types of sensor data may be transmitted from the provider and/or requester devices 102, 104 as local device data 109, 139, respectively. The system 100 may receive and process the local device data 109, 139, using a collision detection sub-system 110, operating in connection with a transport related service 80. According to some examples, the collision detection sub-system 110 is implemented to augment and optimize the transport related service 80. For example, a large number of transportation providers may operate in a given geographic region during a particular time interval. The service providers may operate through numerous alternative services (e.g., transporting people, food delivery, packages, etc.). In this context, the collision detection sub-system 110 can be provided with the transport related service 80 in order to enhance the safety of the service providers and their respective customers (e.g., drivers and passengers), as well as the safety of those in the vicinity of a vehicle collision, who may be injured or negatively affected by a vehicle collision.

Moreover, in any transportation system, collisions are recognized as events which negatively impact the efficiency of the transportation network. For example, vehicle accidents cause traffic jams, which in turn cause commuters to be late, reducing productivity and output. In this regard, examples provide that for the collision detection sub-system 110 to optimize the transportation related service. For example, the collision detection sub-system 110 can be implemented to reduce a response time for emergency responders, thereby increasing the safety to providers and requesters. Additionally, in some examples, the collision detection sub-system 110 can be implemented to proactively initiate appropriate actions to lessen the negative impact of the vehicle collision to those who are directly (e.g., rider within vehicle may be provided an alternative transport) and indirectly affected (e.g., drivers who are heading towards congested area are immediately re-routed).

In some implementations, the service application 106 includes functionality that can vary timing parameters with respect to the manner in which local device data 109, 139 is obtained and transmitted to the network computing system 100. The timing parameters can affect one or more of (i) a rate at which the service application 106 samples local resources (e.g., movement sensors, environmental sensors, GPS, etc.) for readings, (ii) a data or transmission rate at which local device data 109, 139 is transmitted to the network computing system, and/or (iii) a time until a next transmission of a data set of the local device data 109.

In an example of FIG. 1, a transport related service 80 may include a provider device interface 112, a requester device interface 114, a service assignment component 120, and a service data store 124. The provider device interface 112 can establish a network connection with the provider device 102, via execution of the corresponding service application 106, in order to receive local device data 109 from the provider device 102. In one implementation, the provider device interface 112 can establish a connection with multiple provider devices 102 concurrently, with the connection to each provider device using one or more wireless networks (e.g., wireless networks 99A and/or 99B, such as a cellular transceiver, a WLAN transceiver, etc.). Each of the provider and requester device interfaces 112, 114 can include or use an application programming interface (API), such as an externally facing API, to communicate data with one or more provider devices 102 and requester devices 104, respectively. The externally facing API can provide access to the provider device 102 via secure access channels over the network through any number of methods, such as web-based forms, programmatic access via RESTful APIs, Simple Object Access Protocol (SOAP), remote procedure call (RPC), scripting access, etc.

In some examples, the transport related service 80 may be implemented in part by providers, who utilize respective provider devices 102 to communicate with the network computer system 100. Each provider device 102 can communicate continuously, or repeatedly, a provider account identifier 119, as well as a current location 121 of the provider. Each provider may install the service application 106 and establish an account, which is associated with a provider identifier, and other information about the provider (e.g., home address, emergency contacts). The provider device interface 112 may communicate information from the provider device 102 to components and logic to create and maintain profile information 167 for the provider in a provider profile store 166. Additionally, as described in greater detail, each provider device 102 can transmit local device data 109, to enable the provider device interface 112 to augment the provided service by detecting and evaluating vehicle collisions. The provider device interface 112 may receive the communications of the service provider, and record each provider identifier 119 and the respective provider's current location 121. The provider device interface 112 may also record a status of each provider as, for example, available or not available for assignment.

A requester may install the service application 106 on the requester device, in order to establish an account and account identifier 137. The requester device interface 114 may also collect and maintain profile information 169 about the requester. In use, the requester may submit a service request 103 to the transport related service 80 when a corresponding transport related service is desired. The service request 103 may include an account identifier 137 of the requester, as well as a set of service-related parameters. The service parameters may include one or more service locations 141 (e.g., pickup and/or drop-off location) for the service request 103. Depending on implementation, the service application 106 may execute on the requester device 104 to provide the system 100 with local device data 139, which may include, for example, sensor data (e.g., accelerometer data, gyroscope data, microphone data, camera data, etc.).

In providing the transport related service, the system 100 may receive transport requests 103 from one or multiple requesters. The requester device interface 114 can process individual requests by updating the service data store 124 with the pending request 103, the requester identifier 137, the service locations 141 of the request, and other relevant information (e.g., requested service type). The service assignment 120 can be triggered to select service providers for individual requests 103 based on, for example, the current location 121 of candidate service providers, and the service location 141 associated with individual service requests 103.

In this way, the service assignment 120 can communicate with the service data store 124 to assign service providers to transport requests 103. In some examples, the service assignment 120 can select one or more available drivers from the service data store 124 based on a variety of parameters, which may include the current location 121 of the provider relative to the service location 141, as well as the availability (e.g., the provider's state), type of service provided (e.g., level of quality) and/or provider ratings. Once selected, the service assignment 120 assigns a given request 103 to a selected driver. Once a process to assign the service provider to the request 103 is complete, the service assignment 120 notifies the requester device interface 114 of the assignment. The service assignment 120 can update the service data store 124 to reflect the assignment of the requester and the provider.

In some implementations, the transport related service 80 includes service time logic 134, which can interface or integrate with the service data store 124 to determine timing information related to a provided service. For example, the transport related service 80 can determine a pickup time, trip time, or estimated time of arrival for one or multiple service requests, including service requests which are in an unassigned state (e.g., no driver selected for ride request), assigned state (e.g., driver selected and en route to a pickup location), and in-progress (e.g., on trip ride request). In determining the timing information, the service time logic 134 can incorporate factors such as traffic information, which can include information provided from other drivers, news sources, traffic tracking websites.

In the context of transport related services, the collision detection sub-system 110 may include logical components that process the local device data 109, 139 of individual devices 102, 104, for one or multiple classes of users (e.g., riders and drivers). With respect to the provider device 102, for example, the service application 106 can execute to generate and repeatedly (or continuously) transport the local device data 109 and the driver identifier 127 to the network computer system 100 via the provider device interface 112. The collision detection sub-system 110 may process the local device data 109 repeatedly, during, for example, a trip. Alternative, the collision detection sub-system 110 may process the local device data 109 in response to designated events. As described below, for example, the service application 106 can include or execute with a local monitor 116 to transmit local device data 109 when certain device conditions are present, such as (i) the provider device 102 is in a vehicle that is on-trip, and (ii) the provider detects sudden movement and/or change in environmental conditions.

In one implementation, the collision detection sub-system 110 includes event detector 128 and collision evaluator 130. The event detector 128 processes the local device data 109 to make a determination as to whether a collision occurred ("collision event 129"). The event detector 128 may also determine confidence a value 133 for the collision event 129. For example, the determination of the collision event 129 can correspond to a binary value (e.g., "true" and "false") or a trinary determination (e.g., "true", "false" or "unknown" to signify possible collision), and the confidence value 133 can be tupled to the determination. Alternatively, the collision event 129 can be integrated with the confidence value 133 as a score (e.g., 1 to 100), with a threshold number signifying different determinations (e.g., collision occurred).

In some implementations, the determination of the collision event 129 is used by the collision detection sub-system 110 without further evaluation of the event. Thus, for example, any given detected vehicle collision may be treated under a worst-case scenario (e.g., injury). In variations, the collision event 129 may be used to trigger further evaluation of the event for severity. Still further, the event detector 128 may apply a first-pass analysis to detect a likely collision, and the collision evaluator 130 can provide a more computationally intensive analysis to confirm the initial determination, as well as to estimate the collision severity.

In some examples, the event detector 128 may make the determination that a vehicle collision occurred, after which the collision evaluator 130 may evaluate the collision event 129 to determine a severity of the vehicle collision. In some examples, the collision evaluator 130 evaluates the vehicle collision event in a binary fashion (e.g., not severe, severe), or trinary fashion (e.g., moderate, injury possible, severe or fatality likely). Still further, the collision evaluator 130 may implement a scoring system to gauge severity (e.g., 1 to 5 or 1 to 10) of a detected vehicle collision. In some examples, the severity level can include at least one of (i) a first level in which a likelihood of injury is below a first threshold probability, and (ii) a second level in which a likelihood of injury is above a second threshold probability, although any number of levels corresponding to different chances of injury (and injury severity) can be included.

In variations, the event detector 128 and the collision evaluator 130 may be implemented as a common set of processes, in which a collision is both detected and evaluated. Alternatively, the collision evaluator 130 may be implemented as a separate process that confirms the determination of the collision event 129, as well as evaluate the collision for severity.

In some examples, the event detector 128 includes one or more processes that analyze the local device data 109 to detect potential and/or actual collision events for individual vehicles. The event detector 128 may detect potential collision events as those events that precede a likely or possible collision. The event detector 128 may also detect actual collisions with alternative levels of confidence. For example, a collision event 129 may be detected as a candidate event until verified by additional information from other mobile devices in the vicinity of the vehicle.

In variations, the event detector 128 and/or the collision evaluator 130 can use the local device data 109, transmitted from the provider device 102 over a duration in which a vehicle collision is detected or is deemed a possibility, to determine one or more characteristic profiles of a detected vehicle event. The characteristic profiles determined for a given vehicle collision may be based on, for example, (i) position and sensor values as determined over time, (ii) sensor values determined over position, and (iii) characteristic markers of collisions in the sensor values (e.g., maximum, minimum, average values, etc.).

In some examples, the collision evaluator 130 determines a sensor profile 143 of the collision event 129. The sensor profile 143 of the given vehicle collision event 129 can be compared to one or more models that correlate to collision severity. For example, the sensor profile 143 of the collision event 129 can be formulated, separately or in aggregate form, using each of the vehicle's position, velocity and acceleration. The sensor profile 143 can be compared or otherwise evaluated against models that reflect a classification 151 of the severity of the vehicle collision. For example, the sensor profile 143 can correspond to a feature matrix which is matched to a suitable model using a classifier 132. For example, the classifier 132 may match the feature matrix to a model from a model library 135 based on a matrix distance determination that identifies a closest model. In variations, a mathematical (e.g., distance determination, or goodness of fit) or statistical correlation may be made as between the characteristic profiles of the collision event and individual models from a collection of actual models, in order to determine the model that is the "best fit" or most correlative to the particular set of characteristic sensor profiles. In some examples, the severity level can be determined by fitting the local device data 109 to multiple models associated with different levels of injury (major injuries requiring immediate hospitalization, minor injuries that may have latent effects or require long term treatment, no injuries, and false positives). Based on the goodness of fit to the models, the collision evaluator 130 can determine the severity of the vehicle collision and/or confidence values or confidence intervals associated with the severity level. The mathematical and/or statistical correlations can be used to (i) determine or confirm the occurrence of a vehicle collision, and/or (ii) determine a severity of the vehicle collision.

In other variations, the models may be formula-based, to determine, for example, an estimated amount of kinetic energy expended by a detected event, with greater severity being associated with higher kinetic energy expenditure. Thus, for example, the event detector 128 can make a determination that a vehicle collision occurred (or likely occurred), and the collision evaluator 130 can use a formulistic model to determine the severity of the vehicle collision. Other parameters, such as vehicle type, roadway information (e.g., speed of surrounding traffic), historical information about the roadway, and weather, may also be used to weight the determination.

In some examples, the sensor profile 143 can include sub-profiles for movement sensor data 109B and environmental sensor data 109C. The profiles can map sensor values to vehicle position 109A and/or time (e.g., second before and after detected collision). Additionally, in some cases, contextual information can be determined from the sensor data that can weight the determinations. For example, environmental sensor data 109C can weight or conclusively determine the occurrence of the collision event 129 and/or the sensor profile 143 of the collision. For example, barometric data may indicate deployment of airbags and/or the breaking of glass (e.g., exposing the exterior environmental conditions to the cabin of the vehicle). Likewise, a thermometer may also detect the vehicle cabin being exposed to the surrounding environment. Audio data, which can be recorded through the microphone, can detect sounds that are characteristic of a vehicle collision, as well as well as recognizing utterances by passengers involved in the collision. Contextual information, such as road type (e.g., rural road, highway, city street, road material, etc.) may also be determined from maps, which can be stored with, for example, the network computing system 100. Still further, other contextual information, such as information relating to the weather or traffic conditions, can be provided from network information sources (e.g., third-party websites).

By way of example, the collision evaluator 130 can receive the location data as a function of time, and can generate a velocity and/or linear vehicle acceleration profile of the vehicle during a collision event. The vehicle acceleration profile can, for instance, be subjected to a classification process using the classifier 132. Similarly, sensor data from the user device(s) can be compared statistically, or through distance determination, to corresponding modeled sensor data profiles. In some examples, the collision evaluator 130 may weight or assign severity to a detected vehicle collision event based on the presence of markers in the local device data 109. As examples, the markers can include vehicle position (e.g., vehicle outside of driving lane), vehicle orientation (e.g., vehicle facing wrong way), and/or audible input (e.g., key words, audible noise level). Still further, in some examples, environmental sensor data 109C can serve as markers for accident severity. For example, examples recognize that a barometric drop may be correlated to deployment of airbags or shattering of windows. Thus, the presence of barometric data that indicates a sudden barometric drop can serve as a marker of accident severity.

As another example, if the local device data 109 indicates a vehicle has spun around, the contextual information can identify that occurrence. The determination of the spin-out can be used to weight the determination of the collision event 129 or sensor profile 143, but the spin-out occurrence alone may not be sufficient to determine that a vehicle collision occurred. Likewise, with respect to environmental sensor data 109C, the collision detection sub-system 110 may receive contextual information for a road network (e.g., weather, road type or environment), and use factors such as the presence of precipitation to wait the determination that a vehicle collision occurred.

Additionally, contextual information may also be used to weight the determination of the collision event 129. For example, the road type (e.g., city street, highway, rural road, etc.) may be determined from pre-stored map data, and used to weight the determination of the collision event 129. In some variations, the contextual information may also include historical data about the roadway, or a specific segment or location of the roadway. For example, the network computer system 100 may maintain a data store of historical information identifying vehicle collisions by severity or type at specific locations of a roadway. When, for example, the historical information indicates a particular roadway or location is collision-prone, the information can be used to weight the determination of the collision event 129. The historical information may even weight the determination of the severity or type of collision event 129.

Depending on implementation, the event detector 128 and/or the collision evaluator 130 can determine an outcome determination 131 that indicates (i) whether a collision event 129 occurred, and (ii) a severity designation (e.g., classification 151) of the collision. Additional information which may be provided with the outcome determination 131 includes a confidence value as to whether a collision occurred and/or the collision severity determination. The outcome determination 131 may also include information that characterizes the collision by type.

According to some example, corroboration logic 136 can be used to confirm the outcome determination 131, as well as to weight or influence the determination of the collision event 129 or severity designation 151. The corroboration logic 136 can be based on information obtained after-the-fact. For example, if the collision event 129 is detected, the corroboration logic 136 can initiate a message to the provider device 102, requesting confirmation that the collision occurred, and/or information about the severity of the collision. The corroboration logic 136 can also use indirect information from other information resources to corroborate the outcome determination 131. For example, in one implementation, the corroboration logic 136 may obtain sensor and/or location data from a second device within another vehicle that may be near the subject of the collision analysis. For example, in the context of transportation services, the corroboration logic 136 can obtain the current location of another provider device that is behind or near the vehicle of the collision event, via the service data store 124. As another example, the corroboration logic 136 can use sensor and/or position data from nearby vehicles to corroborate the occurrence of the collision event.

As another example, the corroboration logic 136 can initiate a workflow where the driver identifier 119 is used to determine the current trip information 145 for the provider device 102 from the service data store 124. The trip information 145 may include the requester identifier 137, as well as the current location of driver and requester devices 102, 104, and the recent history of the respective devices with respect to location. The corroboration logic 136 may corroborate determination of the collision event 129 using the trip information 145 (e.g., both driver and requester devices 102, 104 indicate the vehicle has come to a stop before the vehicle has reached the destination). Additionally, the service data store 124 can identify the requester identifier 137, and enable the corroboration logic 146 to trigger retrieval of local device data 139 from the requester device 104 via the requester device interface 114 (e.g., seconds or minutes after the determination of the collision event 129). In one implementation requester device interface 114 can retrieve local device data 139 from the requester device 104, and provide the local device data 139 to the collision detection subsystem 110.

While variations provide that the requester device 104 can execute its service application 106 to generate the local device data 139 to be of the same type as that used from the provider device 102, some examples provide that the data obtained from the requester device 104 is less intrusive or demanding of the rider's mobile device. For example, the corroboration logic 136 can obtain the local device data 139 from the requester device 104 after-the-fact, and/or only from a particular component or resource. For example, if a driver drops his or her provider device 102 from the moving vehicle, the collision evaluator 130 may mistakenly determine that there has been a vehicle collision because the sensor data from the provider device 102 may indicate a high probability of a vehicle collision (e.g., there has been a high rate of change in the acceleration or the noise associated with dropping the device may sound like a collision). However, if the requester device 104, which is associated with the trip and is therefore in the same vehicle as the driver, does not show a similarly high probability of a vehicle collision, the erroneously high probability of a vehicle collision determined from the provider device 102 can be corrected.

In some implementations, the corroboration logic 136 may also trigger the service application 106 of the respective provider device 102 and/or requester device 104 to initiate a local monitor 116. The local sensor monitor 116 can collect and transmit data from select sensors, such as the microphone or camera, to detect utterances, or to detect whether the driver placed a phone call. Likewise, the service application 106 of the provider device 102 may monitor the usage of the provider device to determine whether the driver placed a call to "911", roadside assistance, or to a family member or friend.

In some examples, an output of the corroboration logic 136 can be used as feedback 147 to train the classifier 132. For example, if the determination of the collision evaluator 130 is a true/positive, a positive feedback can be provided, while a false positive may result in the feedback 147 being negative. Over time, the classifier 132 can be trained with more granular models that reflect different outcomes, given different conditions (e.g., weather, time of day, type of vehicle) and geographic location.

The sensor profiles 143 can also be used to form a basis for models 135. In this way, the models 135 can be based on actual measured sensor and position values of vehicles which have been involved in collisions of various levels of severity. Still further, the models can also include data of vehicles which were involved in false-positives (e.g., close calls).

In some examples, a task manager 140 operates with the collision detection sub-system 110 to determine one or more remedial actions to perform. In particular, the task manager 140 can select to initiate and/or perform a set of remedial actions which can facilitate the passengers of a vehicle involved in a collision, as well as other vehicles or persons who may be indirectly and negatively affected by the vehicle collision. According to variations, the task manager 140 can initiate any one of multiple possible workflows based on a determination of the collision event occurring, and/or based on the classification 151 of the collision. The task manager 140 may include logic to sequence or otherwise time the performance of the various workflows for initiating and completing the remedial actions.

In an implementation, the task manager 140 initiates one or more identification workflows 142 to determine (i) identifiers of persons in the vehicle, and (ii) aggregate profile information 169 about each identified occupant (e.g., provider, requester) the vehicle. The identification workflow 142 may, for example, cross-reference the service data store 124 based on the identifier 119 provided by the provider device 102, to determine the current trip and the identifier 141 of the requester. In some variations, the identification workflow 142 can check the provider profile store 166 and/or requester profile store 168 determine relevant information from the respective provider profile and/or rider profile. Based on the profile information 169 of the provider and requester, some examples provide that additional workflows can be initiated to perform other actions which are specific to a condition or need of the provider or requester. For example, emergency contact information may be retrieved for each of the provider and requester, and the task manager may compose or initiate communications to each (e.g., text message, automated phone call) to inform the respective emergency contact of the collision event.

As an addition or alternative, the task manager 140 may initiate a completion workflow 144, to allow for the requester to have his requested service completed (e.g., complete the trip for a rider when the vehicle he/she is riding in is involved in an accident). The completion workflow 144 can trigger the service assignment 120 to arrange additional transport for the requester, or the provider, based on the location of the collision event 129. For example, the completion workflow 144 can automatically generate a follow-on service request for the requester based on the location of the collision event 129 or the requester's current location (e.g., requester can be on the side of the road, near the point of the determined collision). The determination to initiate the completion workflow 144 can be in response to, for example, the classification 151 of the determined collision event 129 being light or non-injury. The communication(s) to either the service provider or requester may further be conducted by accessing the respective profiles of each user, based on the identifiers provided through the service data store 124.

As an addition or alternative, the task manager 140 can initiate an assessment workflow 146, to assess (i) the health of the service provider or rider, (ii) vehicle status, and/or (iii) damage or injury to bystanders and surrounding objects. The task manager 140 may deploy one or multiple messaging and communication transports to aggregate the information (e.g., in-app messaging, Short Message Service (SMS), email etc.). The assessment workflow 146 can access the service data store 124 to identify nearby users (e.g., nearby providers), as well as occupants of the vehicle, using position information communicated from the service application 106 executing on each of the respective user devices. The assessment workflow 146 may then use the respective profile stores to determine communication identifiers and transports to utilize in communicating with the intended recipients (e.g., provider, passenger, bystander). Among other examples, the assessment workflow 146 may respond to the determination of the collision event 129 by initiating direct communications with the occupants of the vehicle using, for example, text messages, audible alerts, or phone calls. The assessment workflow 146 may trigger prompts to nearby users to perform actions such as provide responses as to the severity of the collision. In one example, the task manager 140 may send messages to each of the provider and requester devices 102, 104, requesting responses. Alternatively, the assessment workflow 144 can listen through the microphone of the provider and/or requester device 102, 104, and/or provide verbal or acoustic prompts through the speaker of the same device.

Still further, as another example, the task manager 140 can initiate or perform an emergency response workflow 148. Depending on implementation, the emergency response workflow 148 can be performed by default, or as a response when the collision severity classification exceeds a given threshold. The emergency response workflow 148 can initiate, for example, select communication transport and initiate communications for each of (i) emergency responders (e.g., "911" call or text), (ii) towing services, and/or (iii) emergency contacts for users (e.g., individuals who have a service application running on their respective mobile devices) who are determined to be inside the vehicle of the collision. The emergency response workflow 148 can be initiated automatically by default, or in response to a determined condition (e.g., collision severity exceeding a threshold). In some examples, the emergency response workflow 148 may also implement situation-specific remedial actions, such as locating a service provider within a designated vicinity who has ability to assist those involved in the collision. For example, the emergency response workflow 148 can identify a provider who operates a vehicle capable of towing, or a provider who has specialized medical training to render aid.

Additionally, in some examples, the task manager 140 can initiate one or more service optimization workflows 152 directed to alleviating stress on the service provided as a result of the collision. In the context of transport-related services, the occurrence of a collision can result in traffic congestion, affecting other service providers (or users) who are upstream from the site of the collision. A service optimization workflow 152 may use, for example, location information provided in the service data store 124, as well as destination information for each service request, to determine new routes for those service providers who are on routes to pass through or the collision site. Those providers may then be re-routed, based on their distance from the collision site and their intended destinations.

As another example, the task manager 140 can initiate a service optimization workflow 152 to identify assignments of providers and requesters, before service for those assignments initiates (e.g., service provider is en route to service location). The service assignment 120 may have, for example, previously determined assignments for a given number of nearby open service requests based on an optimization objective for a given timing parameter (e.g., reduce time to pickup for one or multiple open requests). The service optimization workflow 152 may estimate changes to traffic conditions based on the determined collision event 129 and the collision severity classification 151. Based on the changes to the traffic conditions, the task manager 140 may implement the service optimization workflow 152 by triggering the service assignment 120 to determine new provider assignments for the open requests. The new assignments may be made in order to optimize for the timing parameter (e.g., time-to-pickup at service location), based on the expected or actual change in traffic conditions. In this respect, the service assignment 120 may determine the new assignments based in part on the service locations of the open requests, the current location of the service providers en route to the service location, and the site of the collision.

As still another example, the task manager 140 may implement the service optimization workflow 152 in order to identify those users (e.g., providers or requesters) who are going to be negatively impacted with delays because of the collision event. For example, service providers who are a short distance behind the collision site may be identified by the task manager 140 using information of the service data store 124. Those users may receive notifications and other assistance to facilitate their expected delay.

Any of the workflows, such as described by examples provided above, can be performed automatically by default, or in response to the occurrence of preconditions. By way of example, the preconditions for triggering a particular workflow may include a determination of collision severity exceeding a threshold, a time of day or traffic condition (e.g., weather), or an outcome of another workflow. Still further, the selection or implementation of a particular workflow may be configured for scenario specific parameters, including user-specific profile information (e.g., requester is elderly and more likely to require aid) or location specific information (e.g., collision on freeway requires different procedure for towing).

Although the example of FIG. 1 is described with respect to the system 100 being implemented remotely from a user's computing device, in other examples, one or more of the components of the system 100 can be implemented by the user's computing device or service application 106.

For example, the service application 106 itself can monitor the one or more environmental conditions and/or position information with execution of the local monitoring logic 116. The local monitoring logic 116 can profile sensor data and/or location data as corresponding local resources are sampled on the computing device. The sensor and location data profiles can, for example, map sensor values for acceleration or position over time, or acceleration values over position. In one example, the local monitoring logic 116 monitors the sensor data and location data for rates of change of the position information over time (e.g., velocity, acceleration, etc.) that may indicate a vehicle collision event, such as sudden acceleration, deceleration and/or sudden directional changes in position inconsistent with normal traffic flow. In some examples, accelerometer, gyroscopes, and/or IMU data the local monitoring logic 116 can be used in conjunction with GPS data. In still other examples, the local monitoring logic 116 can monitor the sensor data for sudden changes in sound and pressure.

In some implementations, the sensor and location data can be sent to system 100 at a given transmission rate that can be varied based on the occurrence of certain events or conditions. For example, the transmission rate (or data rate may be increased) if sampled sensor data suddenly changes in a manner that is consistent with a vehicle collision event. As an illustration, the provider device 102 can record data at a sampling rate of 25 times per second, collect and store the data on the provider device 102 and/or service application 106, and then send the collected data up to one or more servers on the system 100 at a transmitting rate of once every 30 seconds.

In some variations, the provider device interface 112 may be implemented on a separate set of servers or computational resources as those which provide the transport related services. For example, the provider device interface 112 may be implemented on a server (or set of servers) that is dedicated, or otherwise configured to prioritize detecting and evaluating collisions amongst a group of vehicles in a given geographic region. In such examples, when the local monitoring logic 116 detects potential collision events, the local device data 109 may be transmitted to the configured server(s) for immediate processing and action.

In some instances, the local monitoring logic 116 may detect an event that signifies a potential vehicle collision based on the sensor data and/or location data. As a response, one or both of the transmitting rate and the sampling rate can be overridden, prompting the provider device 102 and/or the service application 106 to send data to the remote servers of the system 100 at a different time from what would be expected based on the transmitting rate.

In some examples, after the system 100 detects a potential vehicle collision, the provider device 102 and/or the service application 106 can transmit the sensor data after a shortened period of time (e.g., after 5-15 seconds) instead of waiting a full iteration of the transmitting rate (e.g., 30 seconds). In other examples, the provider device 102 and/or the service application 106 can immediately transmit data to the remote servers of the system 100 after detecting an event that is determined to be a potential vehicle collision event. This immediate response can further human safety, while minimizing the negative impact from vehicle collisions.

Methodology

Figure 2A:
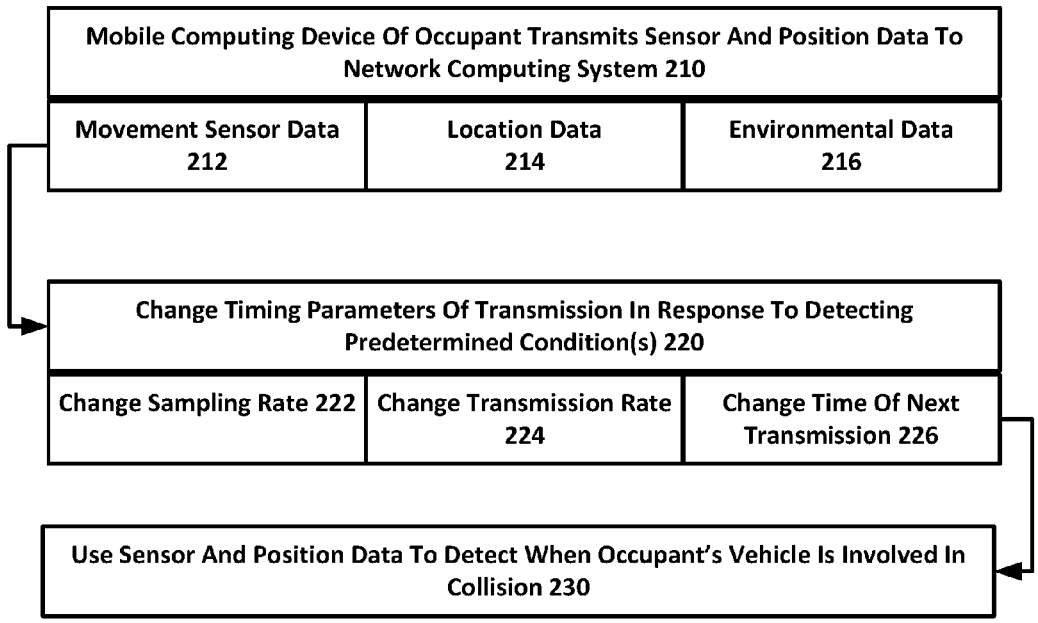
FIG. 2A illustrates an example method for determining a vehicle collision event.
Figure 2B:
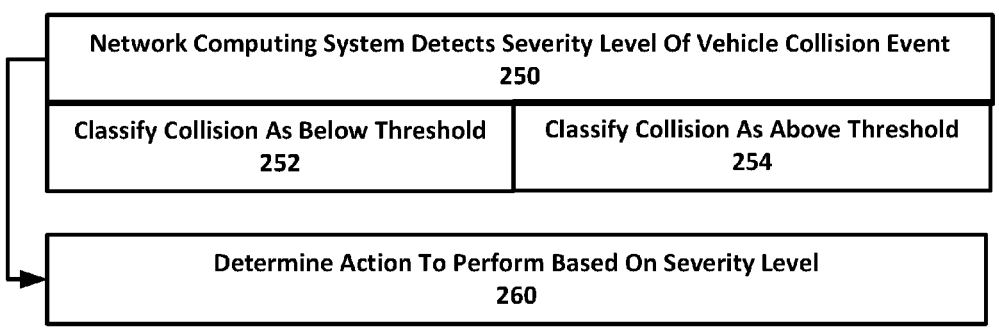
FIG. 2B illustrates an example method for determining a severity of the vehicle collision event.
Figure 3:
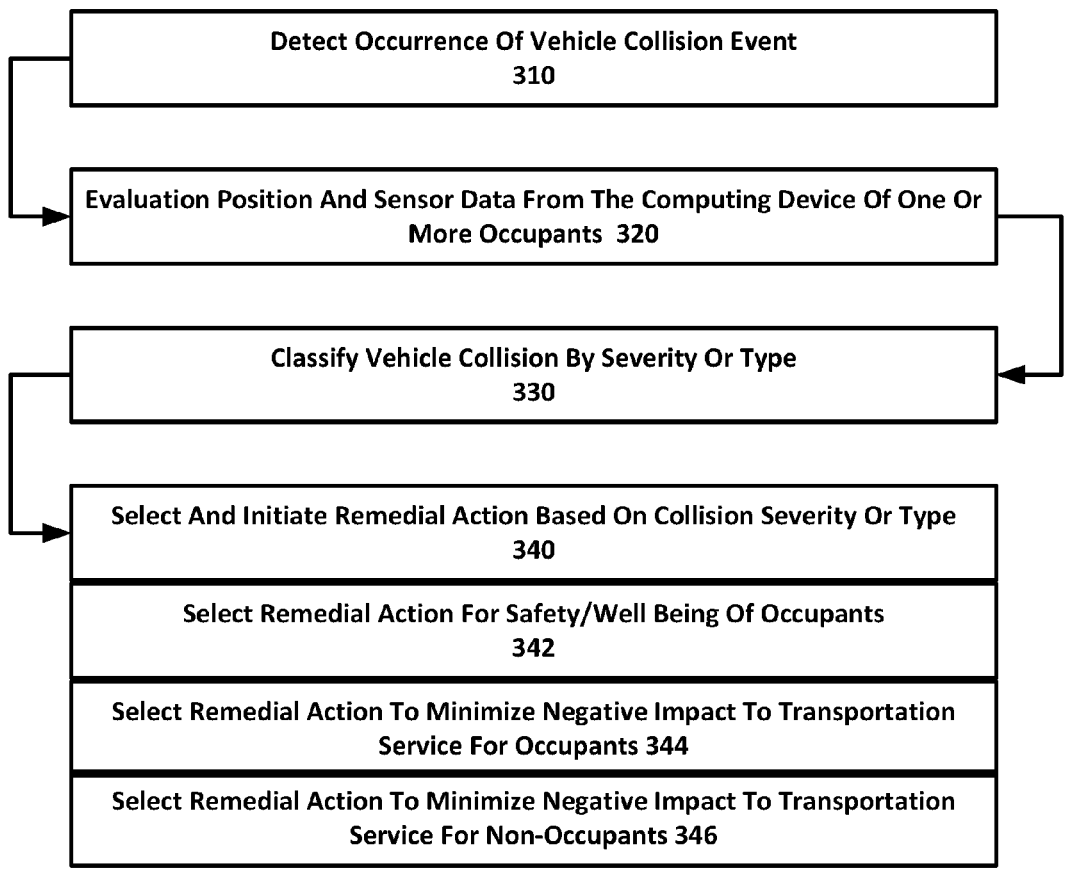
FIG. 3 illustrates an example method for initiating an action based on a detected vehicle collision event.

FIG. 2A illustrates an example method for determining a vehicle collision event. FIG. 2B illustrates an example method for determining a severity of the vehicle collision event. FIG. 3 illustrates an example method for initiating an action based on a detected vehicle collision event. Examples such as described by FIG. 2A, FIG. 2B and/or FIG. 3 can be implemented using, for example, components described with the example of FIG. 1. Accordingly, references made to elements of FIG. 1 are for purposes of illustrating a suitable element or component for performing a step or sub-step being described.

With reference to FIG. 2A, the mobile computing device of a vehicle occupant transmits sensor and position data to a network computing system 100 when the vehicle is on a trip (210). As described with an example of FIG. 1, the network computing system 100 can be implemented at least in part to provide a transport-related service, so that the user is a provider (e.g., driver) and/or requester of the service. In variations, the network computing system 100 can provide other services, such as navigation, vehicle monitoring and safety.

The data which is communicated from the occupant's mobile computing device may include one or more of (i) sensor data from one or more movement sensors (212), (ii) location data determined from a GPS component or other location aware resource (214), and/or (iii) environmental sensor data (e.g., barometric data, temperature, sound, etc.) from one or more sensors that detect information about the environment of the computing device 102 (216).

In some variations, the sensor and/or position data is communicated from multiple computing devices within the vehicle. The sensor data can be varied by, for example, sensor type, quality and/or granularity. For example, the network computer system 100 may collect different types of sensor and position data from the driver and rider of a given vehicle.

According to some examples, an occupant's computing device can transmit sensor and position data to the network computing system 100 in accordance with timing parameters that may vary based on one or more predetermined conditions (220). For example, the provider device 102 may execute the service application 106, in conjunction with the local monitor 116, to process at least a portion of the local device data 109, 139 upon the local monitor detecting a predetermined set of sensor conditions (e.g., sensor values such as acceleration that exceed a threshold value). The predetermined condition(s) may reflect an increased possibility of an imminent or immediate collision. In some variations, the predetermined conditions may include sensors which detect airbag deployment, breaking glass, or unusual acceleration. In response to the local monitor 116 detecting the predetermined condition, one or more timing parameters relating to the gathering and/or transmission of local device data 109, 139 may be changed.

In one example, the sampling rate for determining the sensor and/or position data (e.g., local device data 109, 139) may be increased from a default sampling rate upon detection of the predetermined condition (222). For example, the service application 106 may execute to read certain types of sensor data more frequently from corresponding sensors in response to the detection of the predetermined condition.

As an addition or variation, a transmission rate, reflecting the number of instances in which the sensor and/or position data is transmitted from the occupant's computing device to the network computing system 100 over a given duration of time, may be increased in response to the predetermined condition (224). For example, in response to a vehicle brake skid or other designated event, the mobile device of the driver may initiate a greater number of transmissions per second (as compared to default transmission rate), in anticipation of a potential vehicle collision.

As another addition or variation, a duration of time until a next transmission of data occurs may be decreased upon the detection of the condition or event (226). For example, the local monitor 116 may detect the occurrence of a predetermined event (e.g., sudden braking), after which the service application 106 bypasses its default timing period (e.g., transmit once every second) to immediately transfer local device data 109 from the device to the computer system 100. In this way, the local device data 109 can be transmitted immediately to the network computing system 100 upon the local monitor 116 detecting the predetermined condition that is indicative of the vehicle collision.

In some examples, each of the sampling rate, transmission rate, and time of next transmission can be varied based on the presence of one or more corresponding predetermined conditions. For example, a severe braking event may increase the sampling rate of the accelerometer and/or gyroscope, but the increase in the transmission rate and/or time of next transmission may be varied in response to an event that actually signifies a collision has occurred.

The network computing system 100 uses the sensor and location data of the occupant's computing device to detect when individual vehicles are involved in collisions (230). In some examples, the network computing system 100 utilizes a combination of sensor data and location data to detect the occurrence of collision events. In variations, sensor data can be processed for markers of collision events. Still further, any combination of a portion or all of the sensor data and location data may be used to monitor and detect a vehicle collision event.

With reference to FIG. 2B, the network computing system 100 can also determine a severity level for a detected vehicle collision event (250). In some examples, the network computing system 100 can compare the sensor and location data of an occupant's computing device with models (or profiles) that reflect different types of vehicle collisions. In such examples, a given model can be based on historical data and/or theoretical models which predict an outcome of a determined collision event, given parameters which may be determined from sensor and location data. In variations, the the system 100 can determine multiple severity levels corresponding to a likelihood of injury.

In some examples, the network computing system 100 classifies a vehicle collision event as including at least (i) a first level in which a likelihood of injury is below a first threshold probability (252), and (ii) a second level in which a likelihood of injury is above the first threshold probability, or a second threshold probability (254).

In other variations, any number of levels (or classifications) can be used to describe the severity level of the vehicle collision event. The levels can be predictive of the likelihood of fatality or severe injury. In variations, classification of the collision event may be based on the type of bodily or property injury which is likely (e.g., broken bones, head trauma, latent injuries requiring long term treatment, etc.).

Still further, in some variations, the severity level of a detected vehicle collision event can be based and/or refined from one or more corroborative actions or events (260). In some implementations, the corroborative events can be based on sensor and location data from multiple computing devices within the vehicle (e.g., from provider device 102 and requester device 104). In some implementations, the corroborative actions can include detecting a user interaction with the computing devices from which the position and sensor data was obtained. Still further, corroborative actions can be determined from monitoring the activities of bystanders, or initiating communications with individuals within or outside of the vehicle.

In some examples, the network computing system 100 can determine an action to perform based on the determined severity level (260). For example, the network computing system 100 can dispatch medical services to the location of vehicle collision event. Still further, the network computing system 100 can initiate an insurance claim with an insurance provider, and/or dispatch a tow truck to the location of the vehicle collision event. Whichever action or actions the network computing system 100 determines to take can be based on the classification of the vehicle collision. This may include, for example, programmatic actions to trigger dispatch of emergency medical services when the classification of the vehicle collision event is serious or severe.

Referring to FIG. 3, the network computing system 100 may implement one or more workflows to implement remedial actions that are based on a classification of a detected vehicle collision event. Upon detecting the occurrence of a vehicle collision event (310), some examples provide for evaluating sensor and position data from the computing device of one or more occupants within the vehicle (320). The network computing system 100 classifies the vehicle collision by severity and/or type using the sensor and/or position data (330). Based on the classification, the network computing system 100 selects and initiates one or more remedial actions are selected and performed (340).

In some examples, the remedial actions are selected for the safety and well-being of the vehicle occupants (342). For example, emergency services may be called to the location of the collision event.

In other variations, the remedial actions may be selected to minimize the negative impact to users of the transportation related service whom are directly affected by the collision event (344). For example, the remedial actions may be selected based on an objective to complete a transport service for an occupant of the vehicle that was involved in the collision.

Still further, the remedial actions may be selected to minimize the negative impact to users or persons who are indirectly affected by the collision event (346). For example, services which are in progress but which may be delayed may be provided with notifications, alternative route guidance and/or other remedial services to lessen the delay and/or impact of the delay. Additionally, transport services which have been assigned but not yet initiated may be re-assigned to account for congestion or delay resulting from the vehicle collision.

Hardware Diagram

Figure 4:
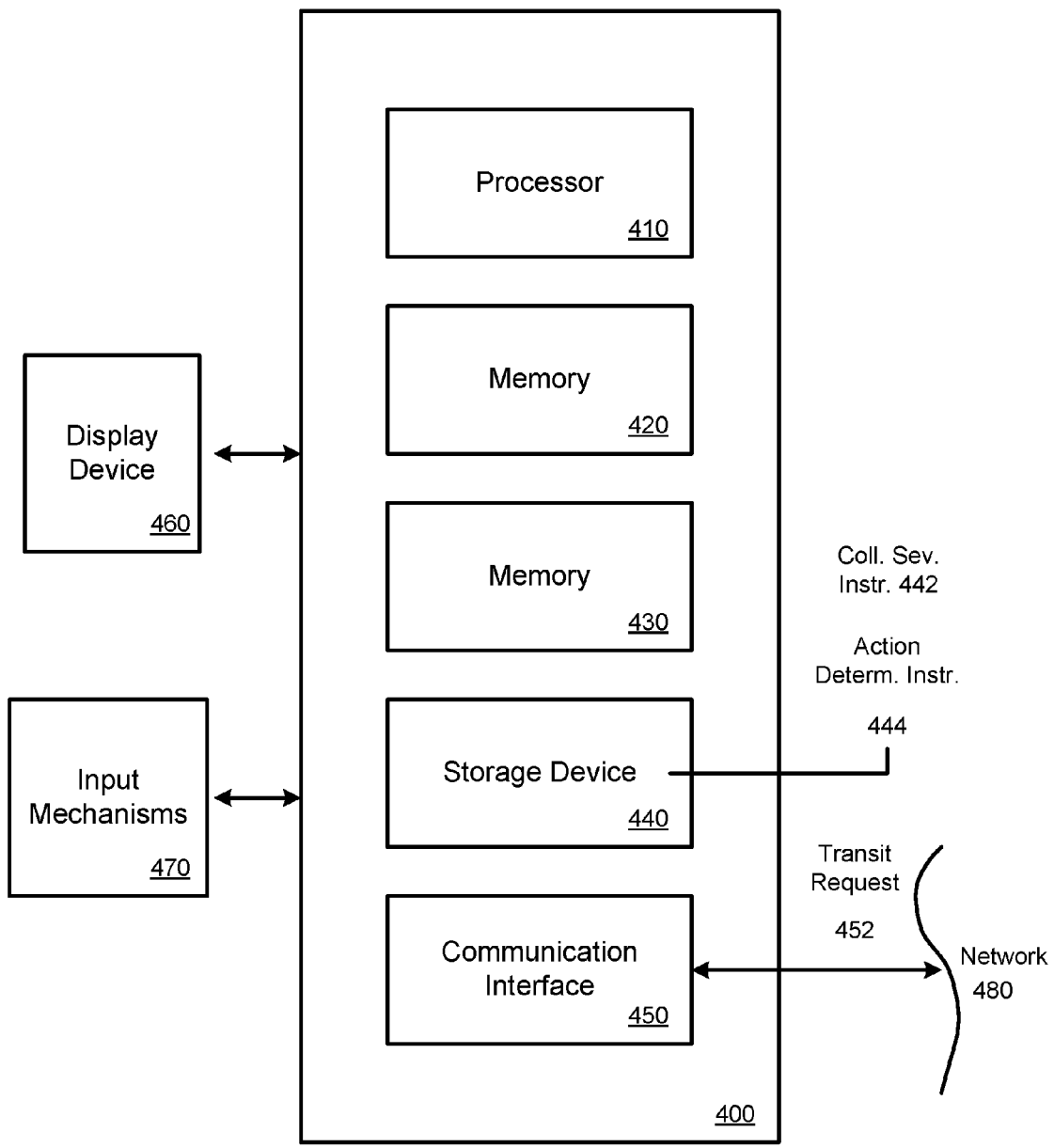
FIG. 4 illustrates a block diagram that illustrates a computer system on which examples described herein may be implemented

FIG. 4 is a block diagram that illustrates a computer system upon which one or more embodiments described herein may be implemented. For example, in the context of FIG. 1, the network computing system 100 may be implemented using a computer system or combination of computer systems, such as described by FIG. 4.

In one implementation, the computer system 400 includes processing resources 410, a main memory 420, other forms of memory (e.g., ROM) 430, a storage device 440, and a communication interface 450. The computer system 400 includes at least one processor 410 for processing information and the main memory 420, such as a random access memory (RAM) or other dynamic storage device, for storing information and instructions to be executed by the processor 410. The main memory 420 also may be used for storing temporary variables or other intermediate information during execution of instructions to be executed by the processor 410. The computer system 400 may also include other forms of memory 430 or other static storage device for storing static information and instructions for the processor 410. A storage device 440, such as a magnetic disk or optical disk, can in some implementations be provided for storing information and instructions, including instructions 442 for determining vehicle collision event severity and instructions 444 for determining an action to initiate based on the vehicle collision event. The processor 410 can execute the instructions 442 to implement a method such as described with examples of FIG. 2A, FIG. 2B, and FIG. 3.

The communication interface 450 can enable the computer system 400 to communicate with one or more networks 480 (e.g., cellular network) through use of the network link (wireless or wireline). Using the network link, the computer system 400 can communicate with one or more other computing devices and/or one or more other servers or data centers. In some variations, the computer system 400 can receive a transit request 452 from a client device of a user via the network link. The transit request 452 can include an identifier of the requester and target, as well as other information such as the transit type.

The computer system 400 can also include a display device 460, such as a cathode ray tube (CRT), an LCD monitor, or a television set, for example, for displaying graphics and information to a user. One or more input mechanisms 470, such as a keyboard that includes alpha-numeric keys and other keys, can be coupled to the computer system 400 for communicating information and command selections to the processor 410. Other non-limiting, illustrative examples of input mechanisms 470 include a mouse, a trackball, touch-sensitive screen, or cursor direction keys for communicating direction information and command selections to the processor 410 and for controlling cursor movement on the display 460.

Examples described herein are related to the use of the computer system 400 for implementing the techniques described herein. According to one embodiment, those techniques are performed by the computer system 400 in response to the processor 410 executing one or more sequences of one or more instructions contained in the main memory 420. Such instructions may be read into the main memory 420 from another machine-readable medium, such as the storage device 440. Execution of the sequences of instructions contained in the main memory 420 causes the processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
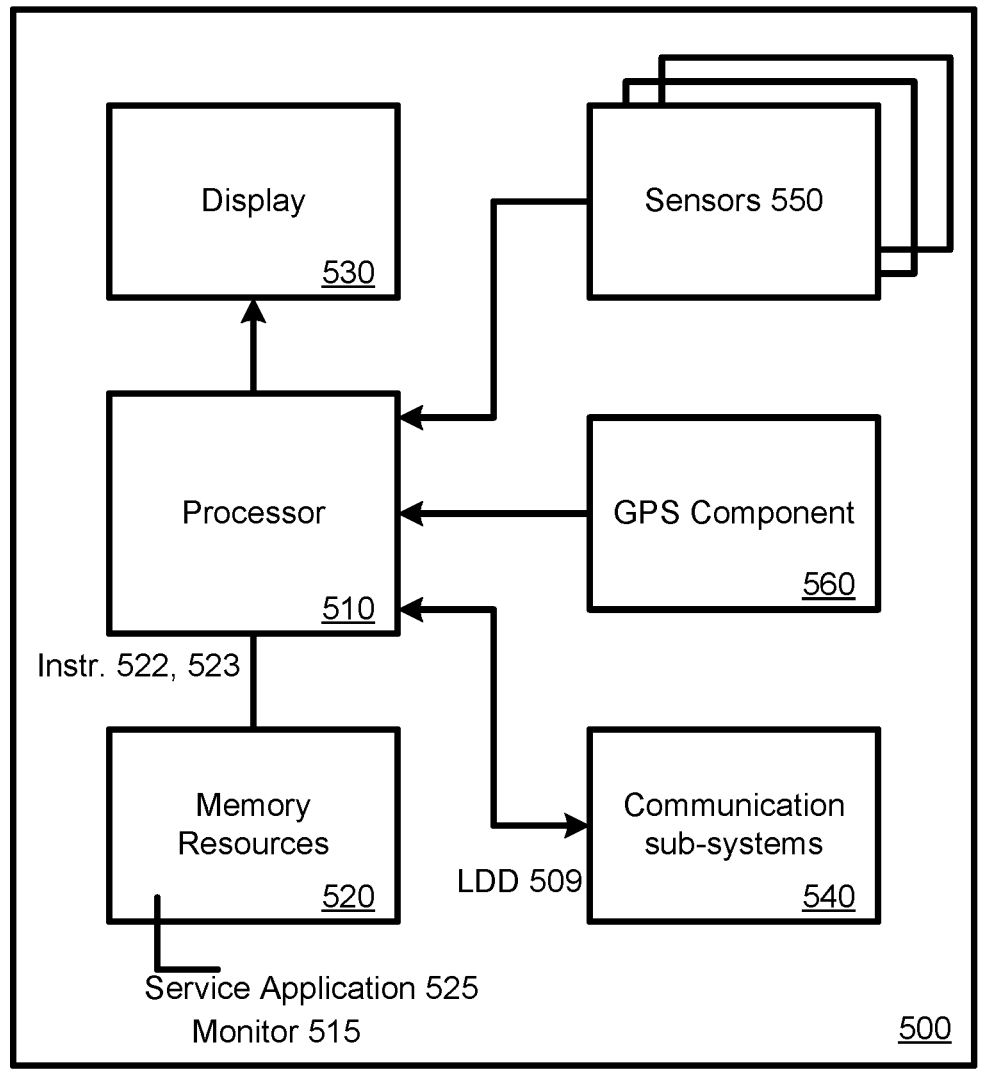
FIG. 5 is a block diagram that illustrates a computing device upon which examples described herein may be implemented.

FIG. 5 is a block diagram that illustrates a computing device for use with some examples as described herein. In one embodiment, a computing device 500 may correspond to a mobile computing device, such as a cellular device that is capable of telephony, messaging, and data services. The computing device 500 can correspond to a device operated by a requester or, in some examples, a device operated by the service provider that provides location-based services (e.g., provider device 102 and requester device 104). Examples of such devices include smartphones, handsets, tablet devices, or in-vehicle computing devices that communicate with cellular carriers. The computing device 500 includes a processor 510, memory resources 520, a display device 530 (e.g., such as a touch-sensitive display device), one or more communication sub-systems 540 (including wireless communication sub-systems), one or more sensors 550 (e.g., accelerometer, gyroscope, barometer, altimeter, microphone, camera), and one or more location detection mechanisms (e.g., GPS component) 560. In one example, at least one of the communication sub-systems 540 sends and receives cellular data over data channels and voice channels. The communications sub-systems 540 can include a cellular transceiver and one or more short-range wireless transceivers. The processor 510 can exchange data with a service arrangement system (not illustrated in FIG. 5) via the communications sub-systems 540.

The processor 510 can provide a variety of content to the display 530 by executing instructions stored in the memory resources 520. The memory resources 520 can store instructions for the service application 525. For example, the processor 510 is configured with software and/or other logic to perform one or more processes, steps, and other functions described with mobile computing devices of occupants of vehicles. In particular, the processor 510 can execute instructions and data stored in the memory resources 520 in order to execute a service application, such as described with various examples.

In one example, the processor 510 may execute instructions 522 to obtain local device data 509 from sampling the sensors 550 and GPS component 540. The processor 510 may also execute the instructions 523 to implement a monitor 515 for detecting a predetermined indicator of an accident. The processor 510 may execute the instructions to transmit the local device data 509 to the computer system 100. In some variations, the transmission may be implemented in accordance with a sampling rate, transmission rate, and/or rate of first transmission (following detection of the predetermined condition) in accordance with logic provided through execution of the service application and/or monitor 505.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method for remotely evaluating collision events of vehicles, the method being implemented by one or more processors of a network computing system and comprising:
   maintaining, on the network computing system, profile information for each of a plurality of users, the profile information associating each user with an account identifier of a network service;
   arranging a transport to be provided in which multiple occupants of a transport vehicle are users of the network service;
   while the transport is in progress, receiving local device data transmitted from a mobile computing device of at least one of multiple occupants of the transport vehicle, the local device data including (i) sensor data from one or more sensors of the mobile computing device, and (ii) location data determined from a position-determination resource of the mobile computing device;
   detecting a vehicle collision event based on the local device data;
   determining a classification of the vehicle collision event based on the local device data, the classification including at least one of (i) a first level in which a likelihood of injury is below a first threshold probability, and (ii) a second level in which a likelihood of injury is above a second threshold probability;
   automatically initiating performance of an action for each of the multiple occupants of the transport vehicle, to mitigate a consequence of the vehicle collision event to that occupant;
   wherein automatically initiating performance of the action for each of the multiple occupants of the transport vehicle includes:
      retrieving profile information that is specific to each of the multiple occupants of the transport vehicle based on the account identifier associated with that occupant; and
      for each of the multiple occupants, determining the action to perform based on the classification of the vehicle collision event and the retrieved profile information that is specific to that occupant.

2. The method of claim 1, wherein the sensor data includes movement data obtained from at least one of an accelerometer or gyroscope of the mobile computing device.

3. The method of claim 1, wherein at least one of detecting the vehicle collision event or determining the classification of the vehicle collision event includes determining at least one of a velocity or acceleration profile of the transport vehicle over position and/or time.

4. The method of claim 1, wherein determining the classification of the vehicle collision event includes comparing a feature set of the detected vehicle collision event to a collection of models which define multiple classes of vehicle collisions.

5. The method of claim 1, wherein the sensor data includes environmental sensor data obtained from at least one of a barometer, thermometer or microphone of the mobile computing device.

6. The method of claim 5, wherein at least one of detecting the vehicle collision event or determining a classification of the vehicle collision event includes processing the environmental sensor data to detect one or more of (i) an airbag deployment, (ii) a glass within the transport vehicle breaking, and/or (iii) an utterance for assistance from a human.

7. The method of claim 1, further comprising initiating one or more operations to corroborate at least one of the vehicle collision event or the classification of the vehicle collision event.

8. The method of claim 7, wherein initiating one or more operations includes monitoring the mobile computing device of each of the multiple occupants of the transport vehicle to detect a user interaction that is indicative of a health of an occupant or a state of the transport vehicle.

9. The method of claim 8, wherein initiating one or more operations includes monitoring the mobile computing device of each of the multiple occupants of the transport vehicle for placement of a phone call.

10. The method of claim 1, wherein receiving local device data includes:
    causing the mobile computing device to obtain and/or transmit the local device data in accordance with one or more timing parameters.

11. The method of claim 10, wherein receiving local device data includes:
    causing the mobile computing device to change the one or more timing parameters in order to provide the network computing system with more sensor data and/or location data in a lesser amount of time.

12. The method of claim 10, wherein the one or more timing parameters include a sampling rate by which the mobile computing device obtains the sensor data and/or the location data from a respective sensor and/or position-determination resource.

13. The method of claim 10, wherein the one or more timing parameters include a transmission or data rate by which the mobile computing device transmits the local device data to the network computing system.

14. The method of claim 10, wherein the one or more timing parameters include a time until a next transmission, and wherein the method further comprises:
    in response to detecting the vehicle collision event, causing the time until next transmission of at least one of the sensor data and the local device data to be reduced on the mobile computing.

15. The method of claim 10, further comprising:
    detecting, on the mobile computing device, one or more predetermined conditions which are indicative of an imminent or immediate vehicle collision; and
    changing, on the mobile computing device, the one or more timing parameters in order to provide the network computing system with more sensor data and/or location data in a lesser amount of time.

16. The method of claim 15, further comprising processing, on the network computing system, the local device data on a dedicated or configured computing resource when the one or more timing parameters are changed.

17. A non-transitory computer readable medium that stores instructions, which when executed by one or more processors of a network computing system, cause the network computing system to perform operations that include:
  maintaining, on the network computing system, profile information for each of a plurality of users, the profile information associating each user with an account identifier of a network service;
  arranging a transport to be provided in which multiple occupants of a transport vehicle are users of the network service;
  while the transport is in progress, receiving local device data transmitted from a mobile computing device of at least one of multiple occupants of the transport vehicle, the local device data including (i) sensor data from one or more sensors of the mobile computing device, and (ii) location data determined from a position-determination resource of the mobile computing device;
  detecting a vehicle collision event based on the local device data;
  determining a classification of the vehicle collision event based on the local device data, the classification including at least one of (i) a first level in which a likelihood of injury is below a first threshold probability, and (ii) a second level in which a likelihood of injury is above a second threshold probability;
  automatically initiating performance of an action for each of the multiple occupants of the transport vehicle, to mitigate a consequence of the vehicle collision event to that occupant;
  wherein automatically initiating performance of the action for each of the multiple occupants of the transport vehicle includes:
    retrieving profile information that is specific to each of the multiple occupants of the transport vehicle based on the account identifier associated with that occupant; and
    for each of the multiple occupants, determining the action to perform based on the classification of the vehicle collision event and the retrieved profile information that is specific to that occupant.

18. A network computer system comprising:
a memory to store a set of instructions;
one or more processors to access the set of instructions to:
  maintain, on a network computing system, profile information for each of a plurality of users, the profile information associating each user with an account identifier of a network service;
  arrange a transport to be provided in which multiple occupants of a transport vehicle are users of the network service;
  while the transport is in progress, receive local device data transmitted from a mobile computing device of at least one of multiple occupants of the transport vehicle, the local device data including (i) sensor data from one or more sensors of the mobile computing device, and (ii) location data determined from a position-determination resource of the mobile computing device;
  detect a vehicle collision event based on the local device data;
  determine a classification of the vehicle collision event based on the local device data, the classification including at least one of (i) a first level in which a likelihood of injury is below a first threshold probability, and (ii) a second level in which a likelihood of injury is above a second threshold probability;
  automatically initiate performance of an action for each of the multiple occupants of the transport vehicle, to mitigate a consequence of the vehicle collision event to that occupant;
  wherein the one or more processors automatically initiate performance of the action for each of the multiple occupants of the transport vehicle by:
    retrieving profile information that is specific to each of the multiple occupants of the transport vehicle based on the account identifier associated with that occupant; and
    for each of the multiple occupants, determining the action to perform based on the classification of the vehicle collision event and the retrieved profile information that is specific to that occupant.

19. The method of claim 1, wherein automatically initiating performance of the action includes:
automatically arranging additional transport for at least one of the multiple occupants to complete that occupant's trip.

20. The method of claim 1, further comprising:
corroborating the classification of the vehicle collision event by identifying another use of the network service that is near the detected vehicle collision event, and sending a communication to the mobile computing device of that user to obtain information about the vehicle collision event.

* * * * *